March 6, 1951     H. ALBRECHT     2,543,750
BEEHIVE
Filed Sept. 16, 1949
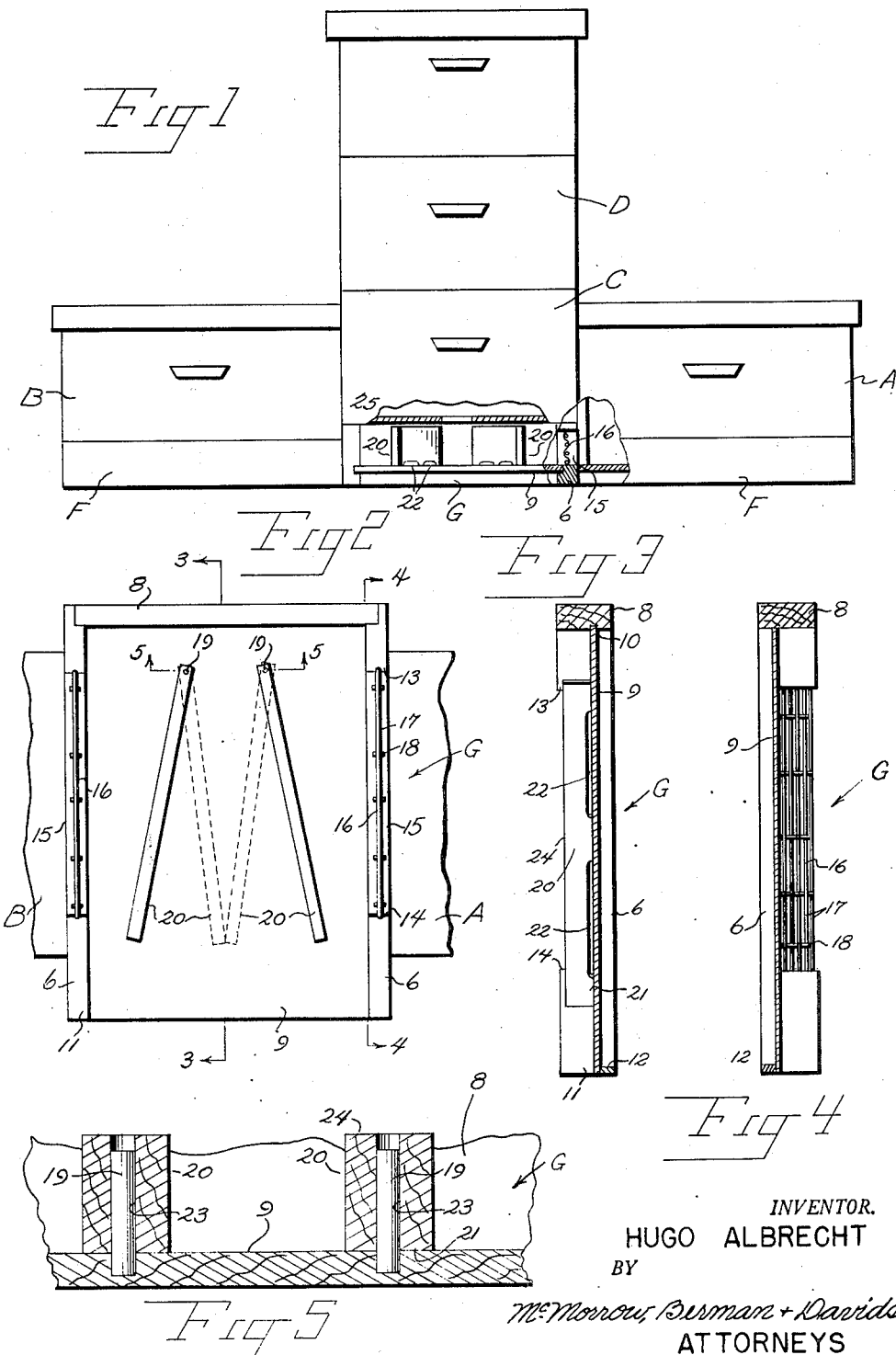
INVENTOR.
HUGO ALBRECHT
BY
McMorrow, Berman + Davidson
ATTORNEYS Patented Mar. 6, 1951

2,543,750

UNITED STATES PATENT OFFICE 2,543,750

BEEHIVE

Hugo Albrecht, Baltimore, Md.

Application September 16, 1949, Serial No. 116,169

3 Claims. (Cl. 6—1)

This invention relates to an improved beehive of the type involving brood chambers, supers, and queen bee excluders, the primary object of the invention being to provide a more efficient arrangement of these components relative to each other, whereby the brooders are rendered more easily accessible, without disturbing the field forces, and whereby congestion in the brood chambers, with accompanying swarming is prevented.

Another important object of the invention is to provide a more practical and more easily-operated, two-queen beehive device of the character indicated above, wherein the queen and drone trap or excluder is of special construction and involves adjustable means to control two working forces in the supers in cooperative relation.

Other important objects and advantageous features of the invention will be apparent from the following description and the accompanying drawings, wherein, merely for illustrative purposes, a specific embodiment of the invention is set forth in detail.

In the drawings:

Figure 1 is a front elevation;

Figure 2 is a top plan view of the queen and drone trap, the cleats being shown in two different positions in full lines and dotted lines, respectively;

Figures 3 and 4 are transverse vertical sections taken on the lines 3—3 and 4—4, respectively, of Figure 2;

Figure 5 is an enlarged fragmentary longitudinal section taken on the line 5—5 of Figure 2.

Referring in detail to the drawings, wherein like numerals designate like parts throughout the several views, the illustrated beehive comprises two spaced brood chambers generally designated A and B, respectively, resting upon corresponding bottom boards F, F, a specially constructed queen and drone trap or excluder G located between the bottom boards F, F and the two brood chambers, and supers C and D superimposed upon each other and resting upon the trap G between the brood chambers A and B.

The excluder G is in the nature of a double-duty bottom board, inasmuch as it serves both as a bottom board used as a queen and drone excluder or trap. The device G comprises two similar parallel side members 6, 6 of vertically-elongated, rectangular cross-section and set on edge to rest upon a supporting surface. A similarly-formed cross-member 8 is connected to and between the rear ends of the side members. A floor plate 9 extends between and is set into the inner sides of the side members 6 and the cross-member 8, as indicated at 10, in spaced relation above the lower edges thereof, and reaches to the forward ends 11 of the side members. The forward end of the floor plate 9 is supported by a cross-member 12 thereunder.

The side members 6, 6 are cut away between the points 13 and 14 to the level of the top of the floor plate 9 to provide trap openings 15, and gratings 16 are set in these openings consisting of horizontal rods 17 vertically spaced to exclude passage therebetween of queen bees and drone bees, but permit passage therebetween of working forces. The rods 17 are spaced and connected by vertical rods 18 positioned at intervals therealong.

Laterally-spaced, vertical pegs 19, 19 positioned at similar distances from the side members 6, 6 and spaced from the back cross-member 8 are set in the floor plate 9, as indicated in Figures 2 and 5, and serve as pivots for related cleats 20, 20.

Each of the cleats 20 consists of a bar substantially shorter than and of smaller rectangular cross-section than the side members 6, having a lower edge 21 to rest upon the floor plate 9 which have spaced longitudinal indentations 22, 22 therein. One end of the cleat is formed with vertical holes 23 receiving pivot pegs 19, whereby the cleats are positioned on the floor plate to be swung toward each other from the full line positions shown in Figure 2 to the dotted line positions shown therein. The upper edges 24 of the cleats are spaced below the upper edges 25 of the side members 6 upon which the lower super C rests, as shown in Figure 1.

The cleats 20 may be adjusted to the dotted line positions of Figure 2, at which time the cleats function as barriers which cause more or less separation of the forces and encourage the same to pass through the openings 15 and 16. Such separation of the forces is advantageous when such forces are more or less unfriendly. After a time, the forces may associate more intimately on a friendly basis. Later on the cleats may be adjusted to the full line positions for encouraging movement of the forces to the upper supers C and D. In fact, the cleats 20 may be swung beyond the positions shown to provide a single entrance to the upper supers.

Both cleats 20 are provided with recesses 22 which function as air vents.

The cleats 20 are adjustable to control the working forces in the supers C and D until both forces from both side brood chambers A and B are properly united. Young brood joining the field force can pass through the excluder G and return to the supers C and D, whereby congestion in the brood chambers is reduced so as to eliminate swarming therein. It will be observed that the brood chambers A and B are readily accessible without disturbing the main working or field force.

What is claimed is:

1. A beehive comprising a pair of laterally-spaced brood chambers, bottom boards beneath said chambers, a combined bottom board and queen and drone trap positioned between said bottom boards, a lower super resting upon said special bottom board between said brood chambers, and another super resting upon said lower super, said combined board having screened passages opening to said brood chamber bottom boards.

2. A beehive comprising a pair of laterally-spaced brood chambers, bottom boards beneath said chambers, a combined bottom board and queen and drone trap positioned between said bottom boards, a lower super resting upon said special bottom board between said brood chambers, and another super resting upon said lower super, said combined board having screened passages opening to said brood chamber bottom boards, said combined bottom board and trap comprising side members upon which said lower super rests, a floor plate extending between said side members below the upper edges of said side members, said screened passages being elongated openings, and queen and drone-excluding grilles extending across said openings.

3. A beehive comprising a pair of laterally-spaced brood chambers, bottom boards beneath said chambers, a combined bottom board and queen and drone trap positioned between said bottom boards, a lower super resting upon said special bottom board between said brood chambers, and another super resting upon said lower super, said combined board having screened passages opening to said brood chamber bottom boards, said combined bottom board and trap comprising side members upon which said lower super rests, a floor plate extending between said side members below the upper edges of said side members, said screened passages being elongated openings, and queen and drone-excluding grilles extending across said passages, a back cross-member extending between the rear ends of said side members and closing off the rear of the space between said members and above said floor plate, a pair of laterally-spaced forwardly and rearwardly-elongated cleats resting upon the upper surface of said floor plate in laterally-spaced relation to said side members, and vertical pivot means traversing the rearward ends of said cleats and securing said cleats on said floor plate to be swung toward and away from each other and toward and away from the related side members across the top of said floor plate, so as to provide adjustable channels directing the passage of bee working forces across said floor plate relative to both of said brood chambers and said supers.

HUGO ALBRECHT.

No references cited.